United States Patent
Yu et al.

(10) Patent No.: US 9,658,658 B2
(45) Date of Patent: May 23, 2017

(54) DATA STORAGE DEVICE MOUNTING STRUCTURE

(71) Applicant: ADLINK TECHNOLOGY INC., New Taipei (TW)

(72) Inventors: Hsiu-Ling Yu, New Taipei (TW); Hsuan-Chan Chiang, New Taipei (TW)

(73) Assignee: Adlink Technology Inc., New Taipei (TW)

( * ) Notice: Subject to any disclaimer, the term of this patent is extended or adjusted under 35 U.S.C. 154(b) by 33 days.

(21) Appl. No.: 14/919,179

(22) Filed: Oct. 21, 2015

(65) Prior Publication Data

US 2017/0115706 A1  Apr. 27, 2017

(51) Int. Cl.
  *G06F 1/18* (2006.01)
  *H05K 5/02* (2006.01)

(52) U.S. Cl.
  CPC ........... *G06F 1/187* (2013.01); *H05K 5/0204* (2013.01)

(58) Field of Classification Search
  CPC ............................ G06F 1/187; H05K 5/0204
  See application file for complete search history.

(56) References Cited

U.S. PATENT DOCUMENTS

| | | | | |
|---|---|---|---|---|
| 5,812,370 A | * | 9/1998 | Moore | G11B 33/121 361/679.35 |
| 6,587,350 B1 | * | 7/2003 | Lin | H05K 7/1411 361/754 |
| 7,558,058 B2 | * | 7/2009 | Hidaka | G11B 33/126 361/679.38 |
| 8,259,441 B2 | * | 9/2012 | Chuang | G06F 1/187 361/679.31 |
| 9,392,719 B1 | * | 7/2016 | Chen | G11B 33/124 |
| 2003/0099094 A1 | * | 5/2003 | Coles | H05K 7/1409 361/726 |
| 2011/0032670 A1 | * | 2/2011 | Tsai | H05K 5/0295 361/679.31 |
| 2011/0085291 A1 | * | 4/2011 | Lin | G06F 1/187 361/679.33 |
| 2012/0087080 A1 | * | 4/2012 | Wu | G06F 1/187 361/679.33 |
| 2012/0147548 A1 | * | 6/2012 | Lin | G11B 33/128 361/679.31 |
| 2012/0176743 A1 | * | 7/2012 | Gong | G11B 33/124 361/679.33 |

(Continued)

*Primary Examiner* — Xanthia C Cunningham
(74) *Attorney, Agent, or Firm* — Muncy, Geissler, Olds & Lowe, P.C.

(57) ABSTRACT

A data storage device mounting structure includes a data storage device insertable through an insertion slot into an accommodation chamber in an electronic device, a mounting assembly including a mounting plate affixed to one corner of the data storage device and a metal wire rod having a middle part thereof bent backwards to provide a curved arch portion and two opposite ends thereof connected to one end of the mounting plate, and an operating handle fixedly fastened to the curved arch portion of the metal wire rod and operable by the user to drag the metal wire rod in pulling the data storage device out of the accommodation chamber of the electronic apparatus conveniently with less effort. The mounting assembly and the operating handle have a small size, and are easy and inexpensive to manufacture.

8 Claims, 9 Drawing Sheets

(56) References Cited

U.S. PATENT DOCUMENTS

| | | | | |
|---|---|---|---|---|
| 2012/0320521 A1* | 12/2012 | Gong | ............... | G11B 33/124 |
| | | | | 361/679.38 |
| 2013/0099640 A1* | 4/2013 | Hu | ............... | G11B 33/124 |
| | | | | 312/223.2 |
| 2014/0345105 A1* | 11/2014 | Brockett | ............... | G06F 1/187 |
| | | | | 29/428 |
| 2015/0077921 A1* | 3/2015 | Tsai | ............... | G11B 33/124 |
| | | | | 361/679.33 |
| 2016/0042768 A1* | 2/2016 | Yang | ............... | G11B 33/128 |
| | | | | 403/322.4 |
| 2016/0135307 A1* | 5/2016 | Schieren | ............... | H05K 5/0204 |
| | | | | 29/428 |

* cited by examiner

DATA STORAGE DEVICE MOUNTING STRUCTURE

BACKGROUND OF THE INVENTION

1. Field of the Invention

The present invention relates to data storage device mounting technology and more particularly, to a data storage device mounting structure, which comprises a data storage device detachably mountable in an accommodation chamber of an electronic apparatus, a mounting plate affixed to one corner of the data storage device, a metal wire rod extended from one end of the mounting plate and movably attached to one end of the data storage device, and an operating handle affixed to the metal wire rod and operable to drag the metal wire rod pulling the data storage device out of the accommodation chamber of the electronic apparatus.

2. Description of the Related Art

With fast development of technology, advanced electronic and electrical devices have been continuously created and widely used to bring convenience comfort to our lives and works and to enhance our working efficiency. More particularly, computer is capable of handling many types of paperwork, Internet access and queries, making drawings and tabular data, and providing powerful computing, and therefore, computers are widely used in our daily works and lives. Modern computers provide a wide range of functions and application convenience. Related application software programs for computer have been continuously created. In consequence, the data storage capacity of modern computers has also been continuously expanded to satisfy different requirements for software application, data storage and data backup. However, regular hard disk drives have a limited data storage capacity. In order to increase the storage capacity of a computer for storing a large amount of data, the user needs to install new hard disk drives or to increase the number of hard disk drives. Some electronic apparatuses (such as host computer, industrial computer or server) provide insertion slots for accommodating removable hard disk drives to expand data storage capacity. For the advantages of high storage capacity and ease of carrying, removable hard disk drives are widely used by people to store and backup electronic data.

Nowadays, removable hard disk drives have been widely used in different electronic apparatuses. A removable hard disk drive needs to be carried in a hard disk drive tray that is insertable through an insertion slot into an electronic apparatus and provided with a ring-shaped carrying handle. However, the hard disk drive tray greatly expands the dimension of the hard disk drive. The fabrication of the hard disk drive tray needs the use of a relatively larger mold. Further, the hard disk drive tray costs a lot. Further, the hard disk drive tray occupies much installation space in the electronic apparatus. Further, after installation of a removable hard disk drive in an insertion slot of an electronic apparatus, the ring-shaped carrying handle can be accidentally hooked up by an external object to pull the removable hard disk drive out of the insertion slot of the electronic apparatus.

Therefore, it is desirable to provide a data storage device mounting design that eliminates the drawbacks of the aforesaid prior art removable hard disk drive design that occupies much installation space can be accidentally hooked up by an external object and pulled out of the insertion slot of the electronic apparatus.

SUMMARY OF THE INVENTION

The present invention has been accomplished under the circumstances in view. It is therefore one object of the present invention to provide a data storage device mounting structure, which comprises a data storage device insertable through an insertion slot in a peripheral wall of an electronic apparatus into an accommodation chamber inside the electronic apparatus, a mounting assembly comprising a mounting plate affixed to one corner of the data storage device and a metal wire rod having a middle part thereof bent backwards to provide a curved arch portion and two opposite ends thereof connected to one end of the mounting plate, and an operating handle fixedly fastened to the curved arch portion of the metal wire rod and operable by the user to drag the metal wire rod in pulling the data storage device out of the accommodation chamber of the electronic apparatus. When assembled, the mounting assembly and the operating handle are closely attached to the rear end of the data storage device without significantly expanding the dimension of the data storage device, and prevented from being hooked up by an external object or pulled by an external force to move the data storage device out of the accommodation chamber of the electronic apparatus accidentally.

Further, the operating handle comprises two opposite side openings symmetrically located on two opposite lateral sides thereof, two elastic retaining rods respectively longitudinally extended from the two opposite lateral sides and respectively suspending at an outer side relative to the respective side openings and terminating in a respectively outwardly protruded retaining flange. After insertion of the data storage device through the insertion slot of the electronic apparatus into the accommodation chamber in the electronic apparatus, the outwardly protruded retaining flanges of the elastic retaining rods of the operating handle are abutted against two opposite sides of the flanged border edge of the insertion slot to hold the data storage device in the accommodation chamber firmly in position. Further, the user can bias the operating handle in direction away from the insertion slot, and then operate the operating handle to pull the metal wire rod in carrying the data storage device out of the accommodation chamber and insertion slot of the electronic apparatus. The mounting assembly and the operating handle have a small size, and therefore, they are easy and inexpensive to fabricate.

Further, the mounting plate of the mounting assembly can be affixed to one corner of the data storage device with a screw or rivet, or using a bonding or soldering technique. The metal wire rod can be made of a steel wire rope, iron wire rod, copper wire rod, nickel wire rod, or metal alloy wire rod. Further, the curved arch portion of the metal wire rod is attached to a fixation plate, and then the fixation plate is affixed to one side of the operating handle with a screw or rivet or using a bonding or soldering technique to fixedly secure the curved arch portion of the metal wire rod to the operating handle. Further, the metal wire rod is tough, resilient, not easily breakable, and durable for long period and repeated application.

Preferably, the operating handle is an elongated plate member, comprising a substantially U-shaped locating groove located in a bottom wall thereof for the positioning of the curved arch portion of the metal wire rod, a rib located at the bottom wall and surrounded by the U-shaped locating groove for supporting the curved arch portion of the metal wire rod in the U-shaped locating groove, two retaining notches located in two opposite lateral sides thereof and respectively disposed in communication with two distal ends of the U-shaped locating groove for securing a part of the metal wire rod, two positioning grooves bilaterally located in an opposing top wall thereof and respectively longitudinally extended from the retaining notches in direction toward the grip portion for the positioning of a part of the metal wire rod, and two guide notches respectively located in the two opposite lateral sides of said operating handle and respectively disposed in communication with respective distal ends of the positioning grooves remove from the retaining notches for guiding the two opposite ends of the metal wire rod toward the mounting plate.

Preferably, the operating handle comprises a grip portion located at one end thereof, a gripping groove defined in an inner side of the grip portion and sloping obliquely outwards, and an abutment portion located at an opposite end thereof remote from the grip portion. After insertion of the data storage device through the insertion slot of the electronic apparatus into the accommodation chamber in the electronic apparatus, the abutment portion of the operating handle is forced into friction engagement with a stop flange at one end of the insertion slot, and thus, the operating handle is firmly positioned in the insertion slot. When going to take the data storage device out of the accommodation chamber of the electronic apparatus, lift the grip portion of the operating handle to impart a pressure to the abutment portion of the operating handle against the stop flange, and then bias the operating handle in direction away from the insertion slot of the electronic apparatus, and then drive the operating handle to pull the metal wire rod and the data storage device out of the accommodation chamber and insertion slot of the electronic apparatus.

Further, when the data storage device mounting structure is assembled, the mounting assembly and the operating handle are closely attached to the rear end of the data storage device without significantly expand the dimension of the data storage device so that the accommodation chamber of the electronic apparatus can be configured according to the size of the data storage device without needing any extra space for accommodating the mounting assembly and the operating handle, and thus, the electronic apparatus can be configured to provide light, thin, short and small characteristics.

DETAILED DESCRIPTION OF THE PREFERRED EMBODIMENT

Figure 1:
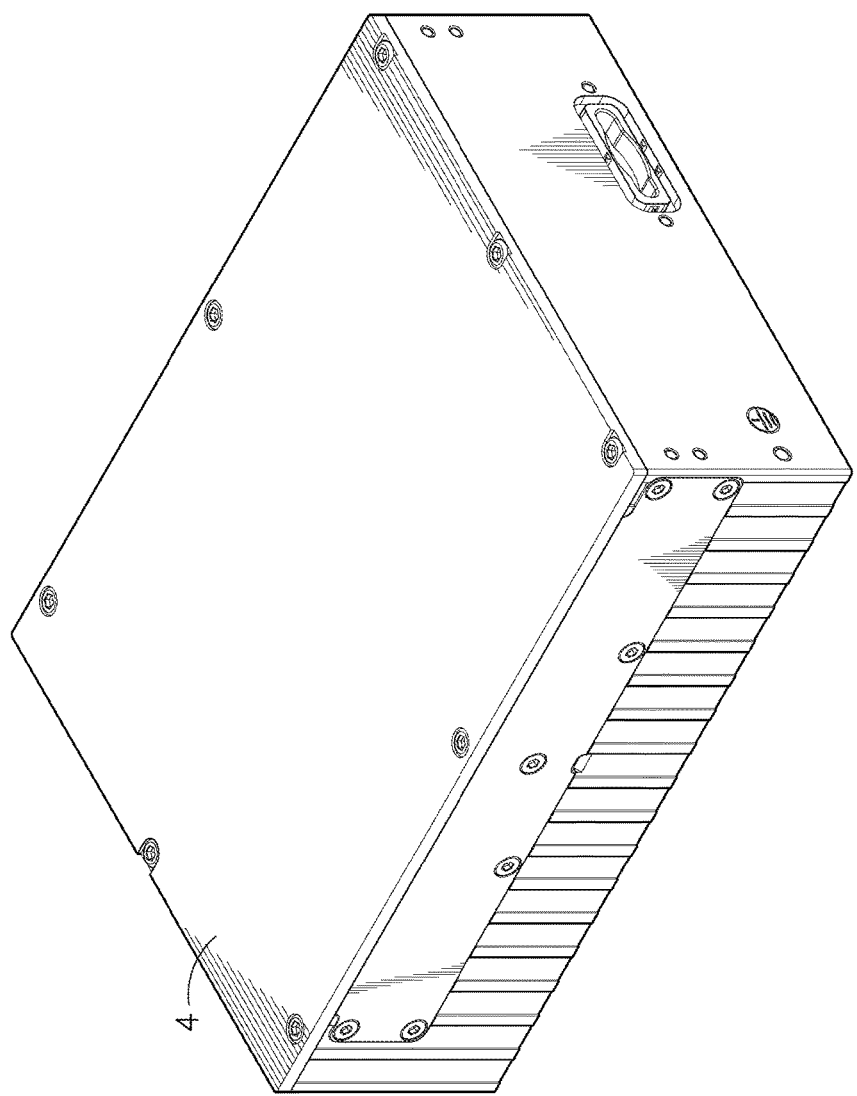
FIG. 1 is an oblique top elevational view of an electronic apparatus embodying the present invention.
Figure 2:
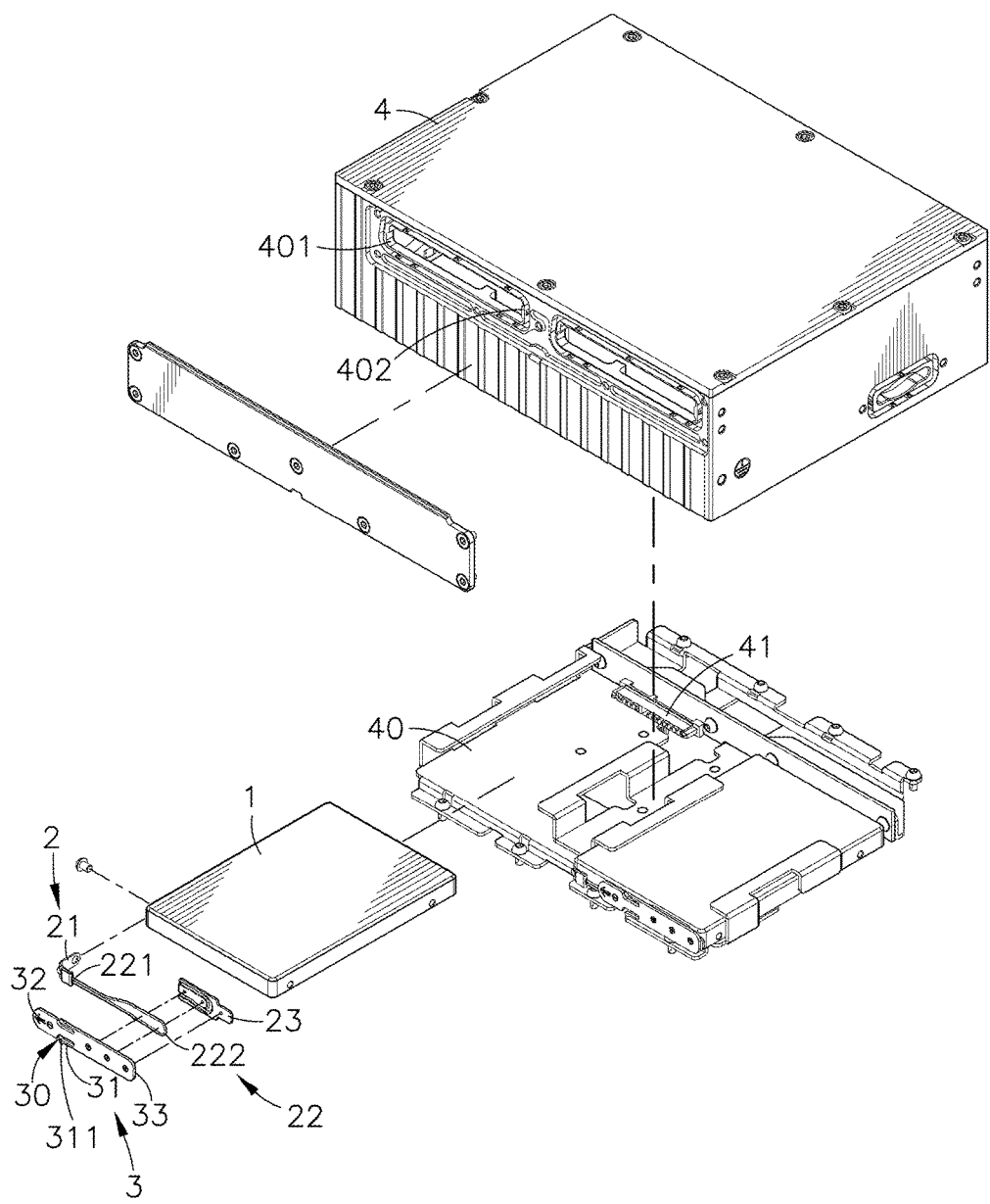
FIG. 2 is an exploded view of the electronic apparatus shown in FIG. 1.
Figure 3:
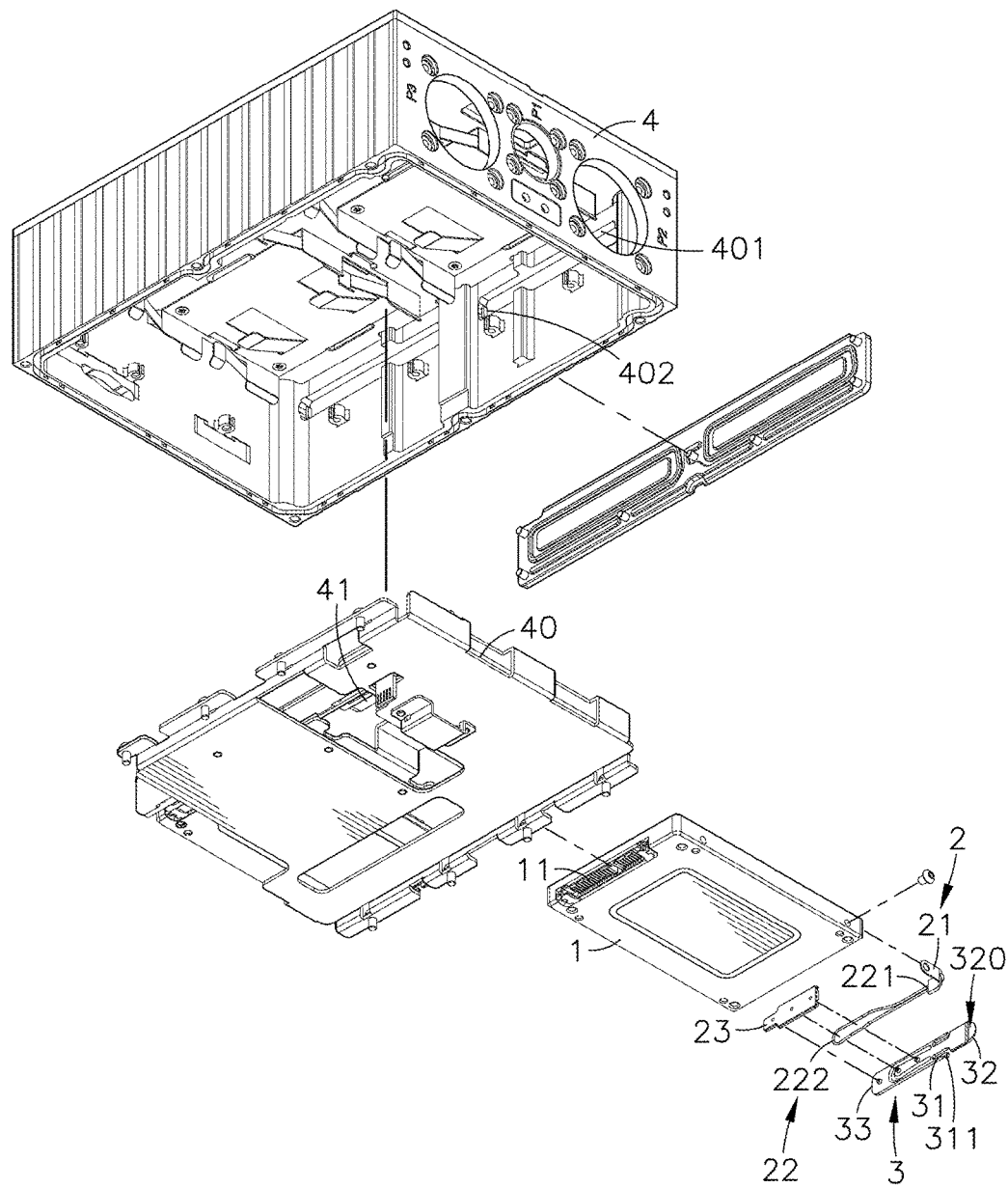
FIG. 3 corresponds to FIG. 2 when viewed from another angle.
Figure 4:
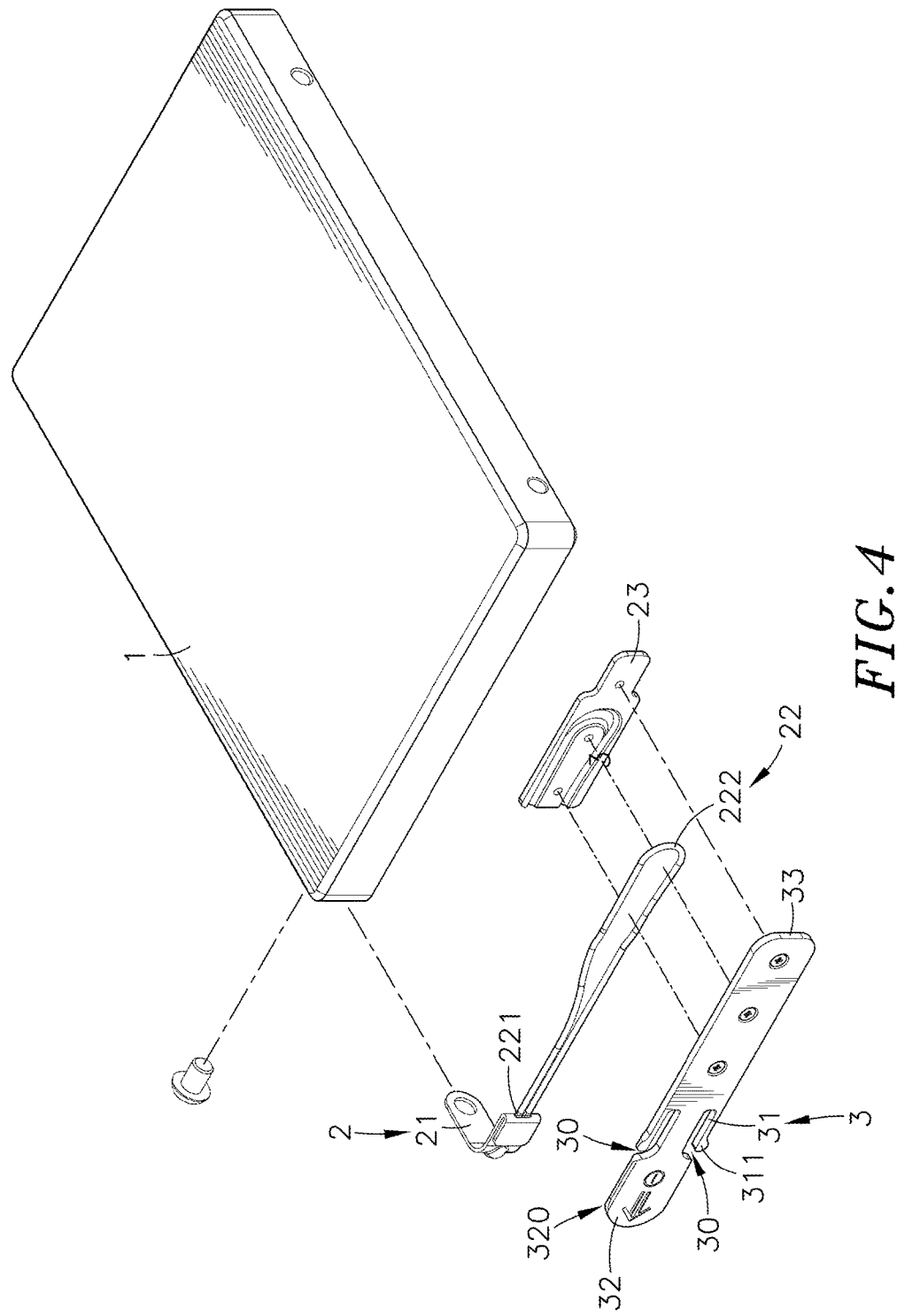
FIG. 4 is an exploded view of the data storage device mounting structure in accordance with the present invention.
Figure 5:
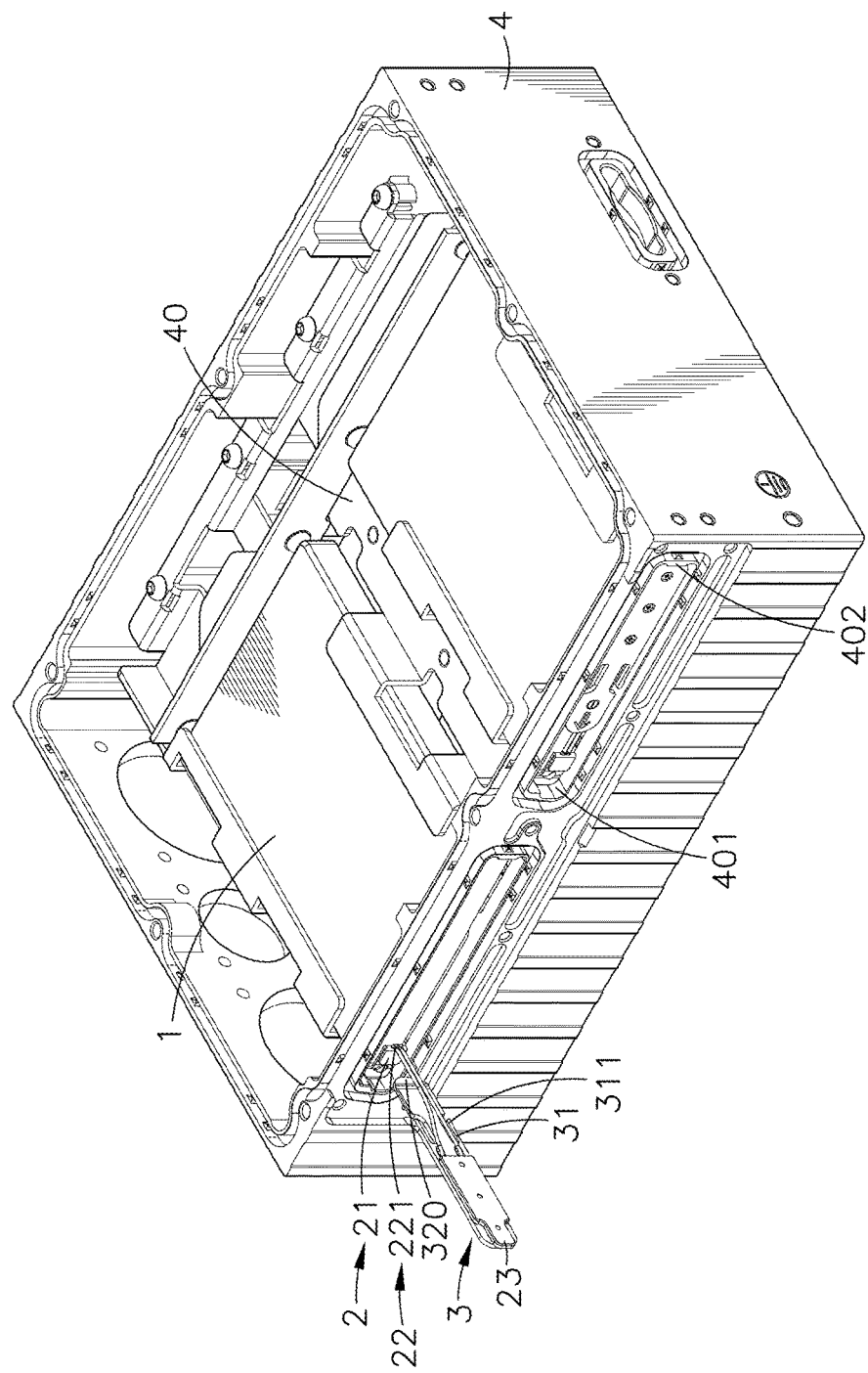
FIG. 5 is a schematic elevational view illustrating the data storage device dismounting operation (StepI).
Figure 6:
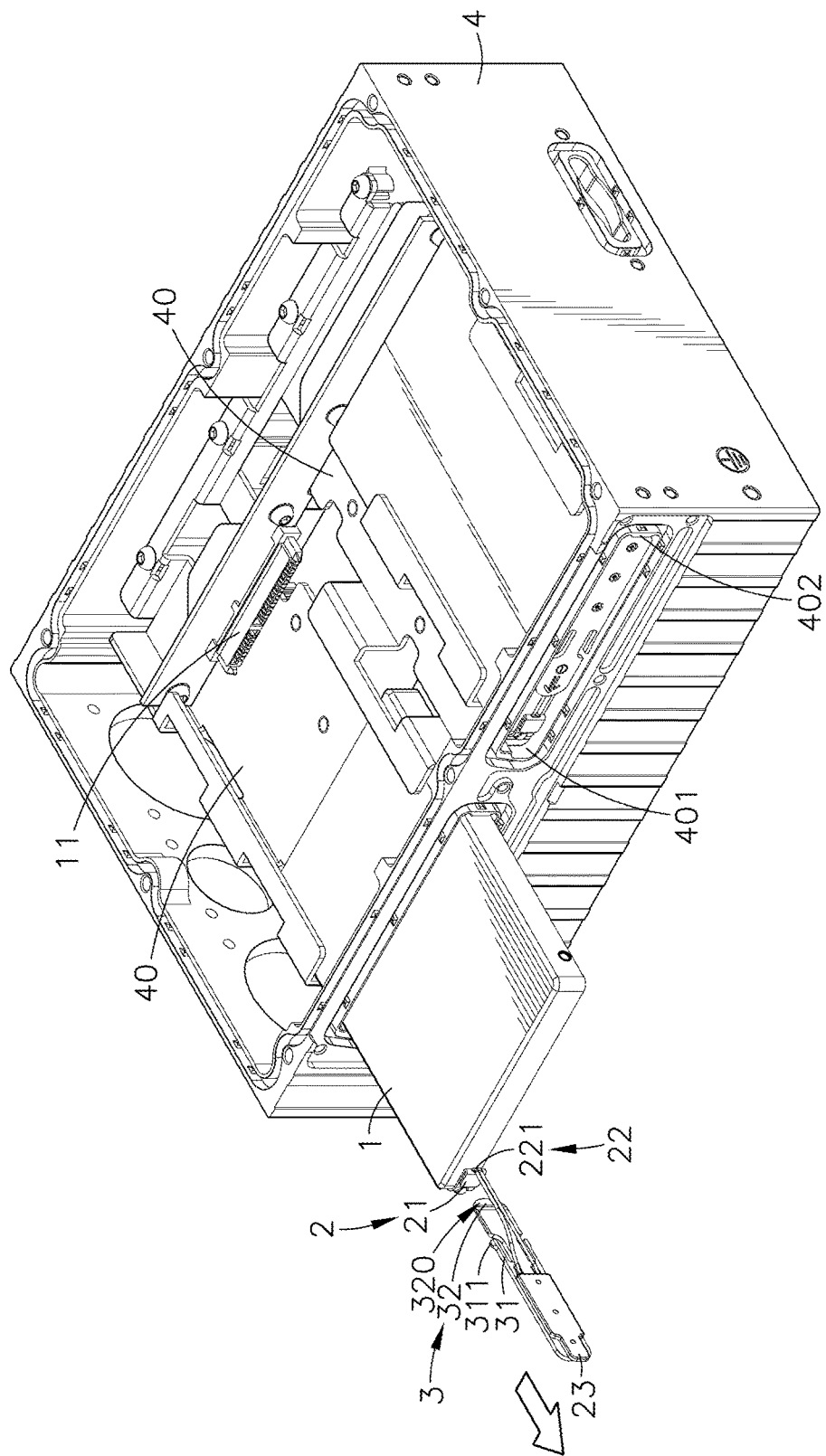
FIG. 6 is a schematic elevational view illustrating the data storage device dismounting operation (StepII).
Figure 7:
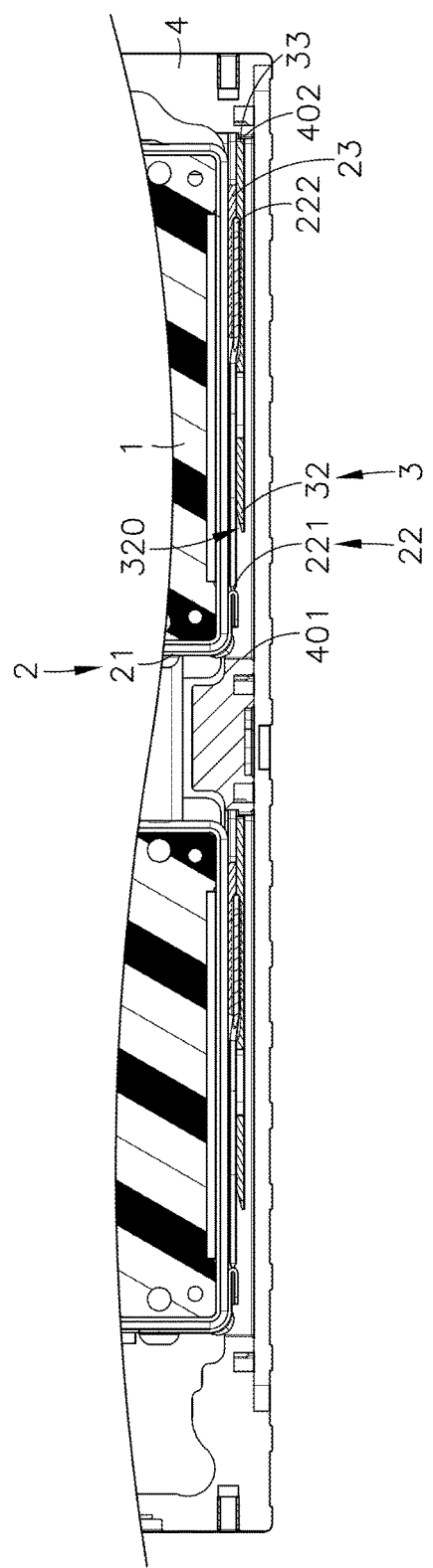
FIG. 7 is a sectional top view of a part of the invention.

Referring to FIGS. 1-4, an oblique top elevational view of an electronic apparatus embodying the present invention, an exploded view of the electronic apparatus, another exploded view of the electronic apparatus and an exploded view of a data storage device mounting structure of the invention are shown. As illustrated, the data storage device mounting structure comprises a data storage device 1, a mounting assembly 2 fastened to the data storage device 1, and an operating handle 3 mounted at the mounting assembly 2.

The data storage device 1 can be, for example, a hard disk drive, comprising an electrical connector 11 located at one end, namely, the front end thereof. The mounting assembly 2 is fastened to one corner of the data storage device 1 and movably abutted against an opposite end, namely, the rear end of the data storage device 1 opposite the electrical connector 11.

The mounting assembly 2 comprises a mounting plate 21, and a metal wire rod 22 connected to one end of the mounting plate 21. The mounting plate 21 is an angled corner plate affixed to one corner of the data storage device 1. The metal wire rod 22 has two opposite ends 221 thereof connected to one end of the mounting plate 21 with a middle part thereof smoothly curved to form a curved arch portion 222.

The operating handle 3 is an elongated plate member, comprising two opposite side openings 30 symmetrically located on two opposite lateral sides thereof, two elastic retaining rods 31 respectively longitudinally extended from the two opposite lateral sides and respectively suspending at an outer side relative to the respective side openings 30 and terminating in a respectively outwardly protruded retaining flange 311, a grip portion 32 located at one end thereof, a gripping groove 320 defined in an inner side of the grip portion 32 and sloping obliquely outwards, and an abutment portion 33 located at an opposite end thereof remote from the grip portion 32.

In installation, affix the mounting plate 21 of the mounting assembly 2 to one corner of the data storage device 1 remote from the electrical connector 11 with a screw or rivet, or using a bonding or soldering technique, and then attach the curved arch portion 222 of the metal wire rod 22 to a fixation plate 23, and then affix the fixation plate 23 to one side of the operating handle 3 adjacent to the abutment portion 33 with a screw or rivet, or using a bonding or soldering technique to fixedly secure the curved arch portion 222 of the metal wire rod 22 to the abutment portion 33, and thus, the data storage device 1, the mounting assembly 2 and the operating handle 3 are assembled.

Further, the metal wire rod 22 of the mounting assembly 2 can be made of a steel wire rope, iron wire rod, copper wire rod, nickel wire rod, or metal alloy wire rod. The two opposite ends 221 of the metal wire rod 22 are moved toward each other and fixedly fastened to one end of the mounting plate 21. The mounting assembly 2 and the operating handle 3 have a small size and are easy and inexpensive to fabricate without a large-scale mold. Further, mounting the mounting assembly 2 and the operating handle 3 in the data storage device 1 does not significantly expand the dimension of the data storage device 1, facilitating storage and carrying.

Referring to FIGS. 2-7, an oblique top elevational view of an electronic apparatus embodying the present invention, an exploded view of the electronic apparatus, another exploded view of the electronic apparatus, an exploded view of a data storage device mounting structure of the invention, a schematic elevational view illustrating the data storage device dismounting operation (Step I), a schematic elevational view illustrating the data storage device dismounting operation (Step II) and a sectional top view of a part of the invention are shown. As illustrated, the data storage device 1 is mountable in an accommodation chamber 40 of an electronic apparatus 4. The electronic apparatus 4 can be a host computer, industrial computer host or server, comprising a mating electrical connector 41 mounted in an inner side inside the accommodation chamber 40, an insertion slot 401 located in a peripheral wall thereof opposite to the mating electrical connector 41, and a stop flange 402 protruded from the peripheral wall and disposed at one side of the insertion slot 401 outside the accommodation chamber 40. The data storage device 1 can be inserted through the insertion slot 401 into the accommodation chamber 40 of the electronic apparatus 4 to force the electrical connector 11 into electrical connection with the mating electrical connector 41. At this time, the operating handle 3 is fit with the metal wire rod 22 into the insertion slot 401 to force the abutment portion 33 of the operating handle 3 into friction engagement with the stop flange 402 at one side of the insertion slot 401 and to simultaneously elastically abut the retaining flanges 311 of the elastic retaining rods 31 of the operating handle 3 against two opposite sides of the flanged border edge of the insertion slot 401. Thus, the operating handle 3 is positioned in the insertion slot 401 in a substantially flush manner, less vulnerable to risk of being pulled out of the insertion slot 401 accidentally by an external object. Thus, the data storage device 1 is firmly positioned in the accommodation chamber 40 with the electrical connector 11 thereof electrically connected to the mating electrical connector 41 of the electronic apparatus 4.

When going to take the data storage device 1 out of the accommodation chamber 40 of the electronic apparatus 4, insert one finger, a screwdriver, key or any other similar object into the gripping groove 320 at the bottom side of the grip portion 32 of the operating handle 3 and then lift the grip portion 32 of the operating handle 3 with fingers or the screwdriver, key or the like to impart a pressure to the abutment portion 33 of the operating handle 3 against the stop flange 402 at one end of the insertion slot 401 and to further bias the operating handle 3 in direction toward the outside of the insertion slot 401, disengaging the outwardly protruded retaining flanges 311 of the elastic retaining rods 31 of the operating handle 3 from the flanged border edge of the insertion slot 401. At this time, the operating handle 3 is kept away from the rear end of the data storage device 1, and can be driven by hand to pull the metal wire rod 22 in carrying the mounting plate 21 and the data storage device 1 out of the accommodation chamber 40 of the electronic apparatus 4. Further, the metal wire rod 22 is tough, resilient, not easily breakable, and durable for long period and repeated application.

Further, the mounting assembly 2 and the operating handle 3 are closely attached to the rear end of the data storage device 1 without significantly expand the dimension of the data storage device 1 so that the accommodation chamber 40 of the electronic apparatus 4 can be configured according to the size of the data storage device 1 without needing any extra space for accommodating the mounting assembly 2 and the operating handle 3, and thus, the electronic apparatus 4 can be configured to provide light, thin, short and small characteristics.

Figure 8:
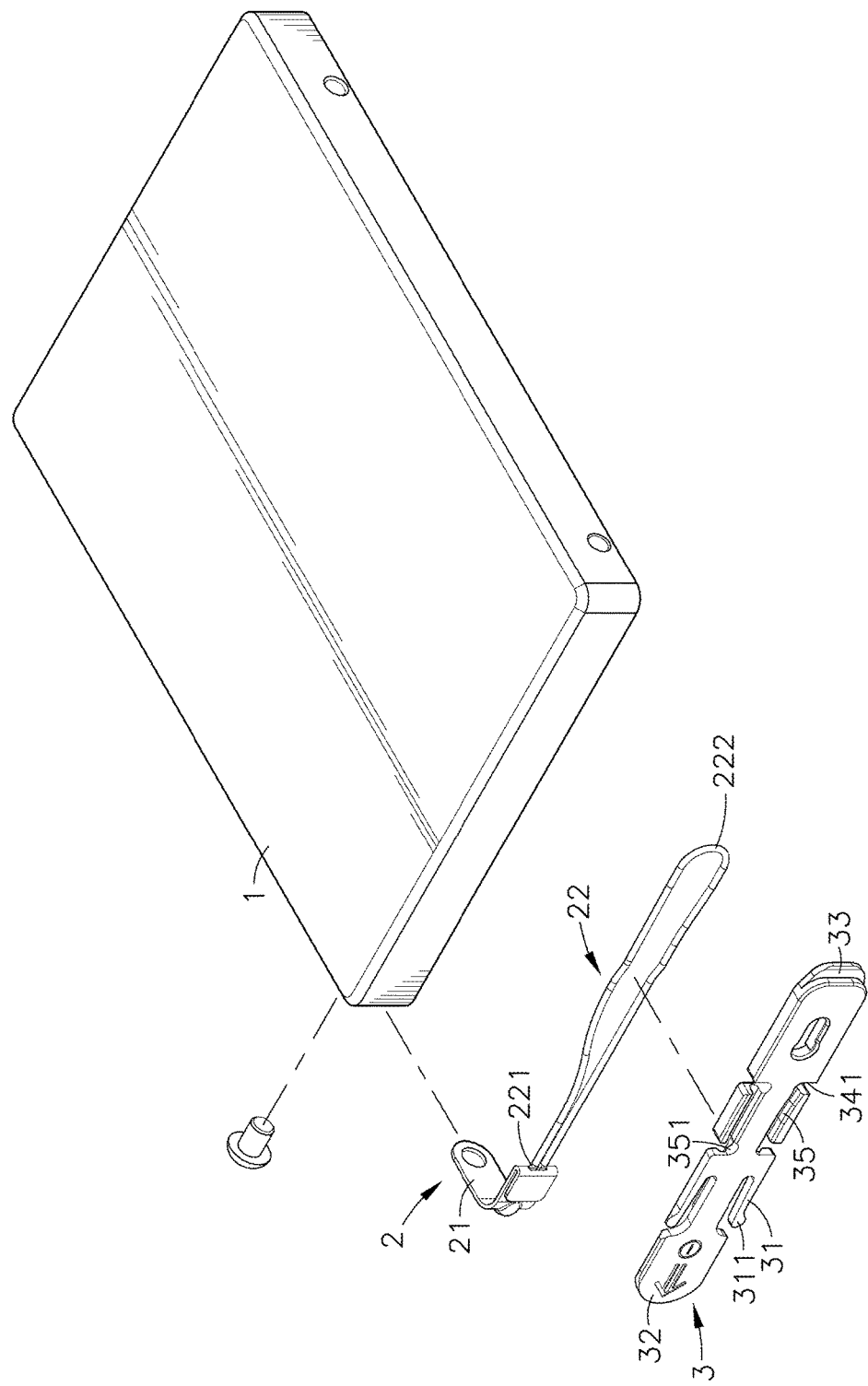
FIG. 8 is an exploded view of an alternate form of the data storage device mounting structure in accordance with the present invention.
Figure 9:
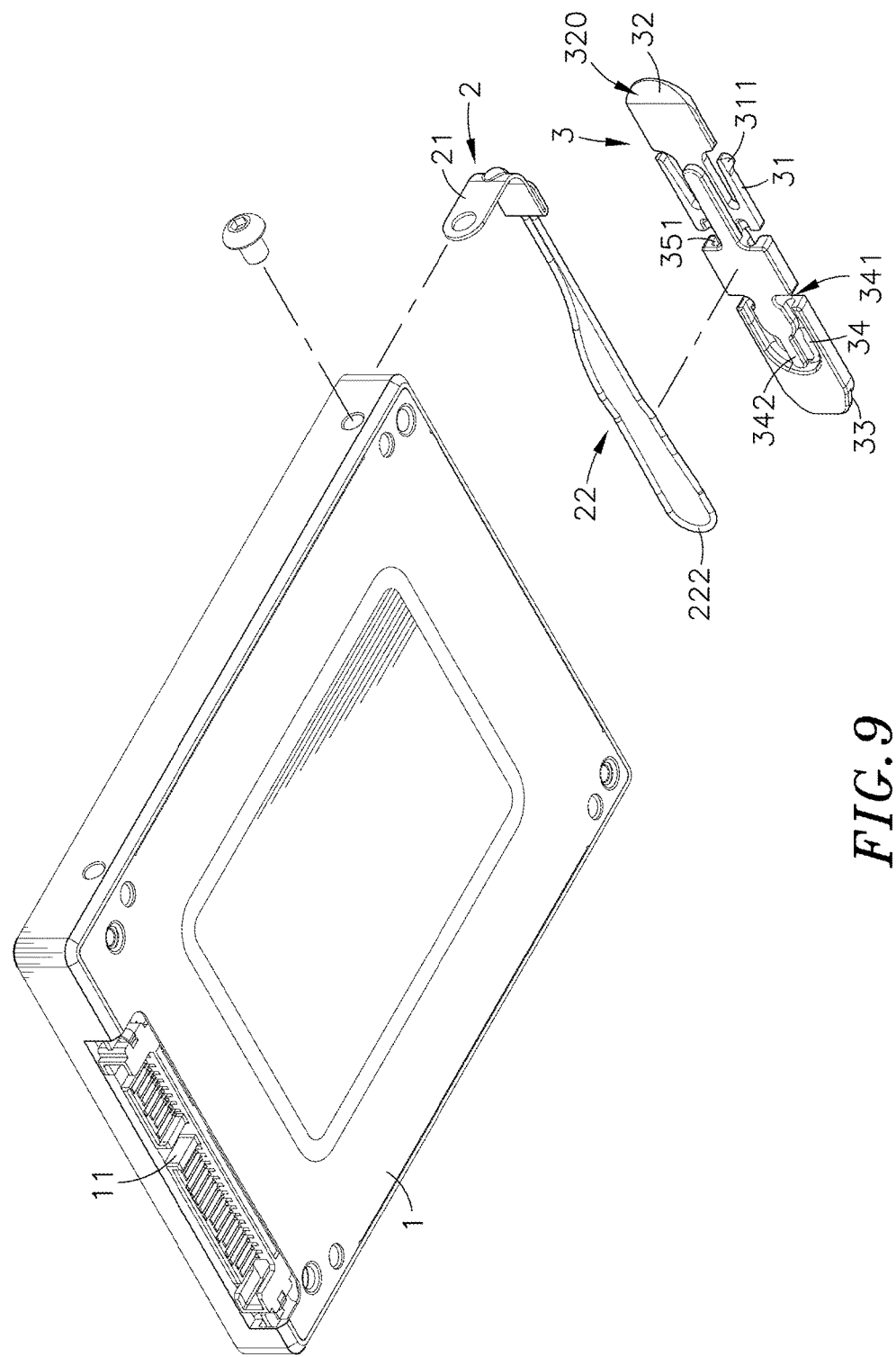
FIG. 9 corresponds to FIG. 8 when viewed from another angle.

Referring to FIGS. 8 and 9 wherein FIG. 8 an exploded view of an alternate form of the data storage device mounting structure in accordance with the present invention; FIG. 9 corresponds to FIG. 8 when viewed from another angle. This alternate form is substantially to the embodiment shown in FIGS. 2-4 with the exception of the structure of the operating handle 3. According to this alternate form, the operating handle 3 is an elongated plate member, comprising a substantially U-shaped locating groove 34 located in a bottom wall thereof, a rib 342 located at the bottom wall and surrounded by the U-shaped locating groove 34, two retaining notches 341 located in two opposite lateral sides thereof and respectively disposed in communication with two distal ends of the U-shaped locating groove 34, two positioning grooves 35 bilaterally located in an opposing top wall thereof and respectively longitudinally extended from the retaining notches 341 in direction toward the grip portion 32, and two guide notches 351 respectively located in two opposite lateral sides and respectively disposed in communication with respective distal ends of the positioning grooves 35 remove from the retaining notches 341. The curved arch portion 222 of the metal wire rod 22 of the mounting assembly 2 is press-fitted into the U-shaped locating groove 34 of the operating handle 3 and supported on the rib 342, enabling the two opposite ends 221 of the metal wire rod 22 to be respectively extended in a proper order through the two retaining notches 341, the two positioning grooves 35 and the two guide notches 351, and then connected to one end of the mounting plate 21, which is affixed to one corner of the data storage device 1 with a screw or rivet, or using a bonding or soldering technique. Thus, the curved arch portion 222 of the metal wire rod 22 is hooked on the rib 342 and firmly positioned in the U-shaped locating groove 34 and prohibited from displacement relative to the operating handle 3. Because the metal wire rod 22 is tough and resilient, it is durable for long period application and can be driven by the operating handle 3 to pull the data storage device 1 out of the accommodation chamber 40 of the electronic apparatus 4 conveniently with less effort. As stated above, in the data storage device mounting structure, the mounting plate 21 of the mounting assembly 2 is affixed to one corner of the data storage device 1; the metal wire rod 22 has the two opposite ends thereof connected to one end of the mounting plate 21; the operating handle 3 is fixedly fastened to the curved arch portion 222 of the metal wire rod 22 and closely attached to the rear end of the data storage device 1. After insertion of the data storage device 1 through the insertion slot 401 of the electronic apparatus 4 into the accommodation chamber 40, the outwardly protruded retaining flanges 311 of the elastic retaining rods 31 of the operating handle 3 are abutted two opposite sides of the flanged border edge of the insertion slot 401. When going to take the data storage device 1 out of the insertion slot 401 and accommodation chamber 40 of the electronic apparatus 4, the user can bias the operating handle 3 in direction away from the insertion slot 401, and then operate the operating handle 3 to pull the metal wire rod 22 in carrying the data storage device 1 out of the insertion slot 401 and accommodation chamber 40 of the electronic apparatus 4. Further, when the user lifts the grip portion 32 of the operating handle 3, a pressure is imparted to the abutment portion 33 of the operating handle 3 against the stop flange 402 at one end of the insertion slot 401, enabling the operating handle 3 to be conveniently biased in direction toward the outside of the insertion slot 401, disengaging the outwardly protruded retaining flanges 311 of the elastic retaining rods 31 of the operating handle 3 from the flanged border edge of the insertion slot 401. Further, the metal wire rod 22 is tough, resilient, not easily breakable, and durable for long period and repeated application. Further, because the operating handle 3 can be closely attached to the rear end of the data storage device 1 and kept in insertion slot 401 after installation of the data storage device 1 in the accommodation chamber 40, the operating handle 3 will not be hooked up by an external object or pulled by an external force to move the data storage device out of the accommodation chamber 40 of the electronic apparatus 4 accidentally.

In conclusion, the invention provides a data storage device mounting design, which comprises a data storage device mountable in an accommodation chamber of an electronic apparatus, a mounting assembly comprising a mounting plate affixed to one corner of the data storage device and a metal wire rod having a middle part thereof bent backwards to provide a curved arch portion and two opposite ends thereof connected to one end of the mounting plate, and an operating handle fixedly fastened to the curved arch portion of the metal wire rod and operable by the user to drag the metal wire rod in pulling the data storage device out of the accommodation chamber of the electronic apparatus. The mounting assembly and the operating handle have a small size, and are easy and inexpensive to manufacture. After installation, the mounting assembly and the operating handle do not significantly expand the dimension of the data storage device, facilitating storing and carrying the data storage device. The metal wire rod is tough, resilient and durable for long period application, and can be driven by the operating handle to pull the data storage device out of the accommodation chamber of the electronic apparatus conveniently with less effort, facilitating mounting and dismounting of the data storage device.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A data storage device mounting structure, comprising:
   a data storage device defining a front end and an opposing rear end;
   a mounting assembly comprising a mounting plate affixed to one corner of said data storage device and a metal wire rod pivotally connected to one end of said mounting plate and turnable relative to said mounting plate to closely attach to the rear end of said mounting plate; and
   an operating handle affixed to said metal wire rod of said mounting assembly, said operating handle comprising two elastic retaining rods respectively longitudinally extended from two opposite lateral sides thereof.

2. The data storage device mounting structure as claimed in claim 1, wherein said data storage device is a hard disk drive, comprising an electrical connector located at an opposite end thereof remote from said mounting plate; said metal wire rod is selectively made of steel wire rope, iron wire rod, copper wire rod, nickel wire rod or metal alloy wire rod.

3. The data storage device mounting structure as claimed in claim 2, wherein said mounting plate is affixed to one corner of said data storage device with a screw or rivet, or using a bonding or soldering technique.

4. The data storage device mounting structure as claimed in claim 1, wherein said data storage device comprises an electrical connector electrically connectable to a mating electrical connector of an electronic apparatus that comprises an accommodation chamber adapted for accommodating said data storage device, an insertion slot located in a peripheral wall thereof in communication with said accommodation chamber for the insertion of said data storage device into said accommodation chamber to let said two elastic retaining rods of said operating handle be positioned in said insertion slot, and a stop flange located at one end of said insertion slot for friction engagement with one end of said operating handle; said operating handle comprises a grip portion located at an opposite end thereof, and a gripping groove defined in an inner side of said grip portion and sloping obliquely outwards.

5. The data storage device mounting structure as claimed in claim 1, wherein said metal wire rod of said mounting assembly has two opposite ends thereof pivotally connected to one end of said mounting plate and a middle part thereof disposed remote from said mounting plate and smoothly curved to form a curved arch portion; said mounting assembly further comprises a fixation plate affixed to one side of said operating handle with a screw or rivet, or using a bonding or soldering technique to fixedly secure said curved arch portion of said metal wire rod to said operating handle.

6. The data storage device mounting structure as claimed in claim 1, wherein said metal wire rod of said mounting assembly has two opposite ends thereof connected to said mounting plate and a middle part thereof smoothly curved to form a curved arch portion; said operating handle comprises an abutment portion secured to said curved arch portion of said metal wire rod.

7. The data storage device mounting structure as claimed in claim 6, wherein said operating handle is an elongated plate member, comprising a substantially U-shaped locating groove located in a bottom wall thereof for the positioning of said curved arch portion of said metal wire rod, a rib located at said bottom wall and surrounded by said U-shaped locating groove for supporting said curved arch portion of said metal wire rod in said U-shaped locating groove, two retaining notches located in two opposite lateral sides thereof and respectively disposed in communication with two distal ends of said U-shaped locating groove for securing a part of said metal wire rod, two positioning grooves bilaterally located in an opposing top wall thereof and respectively longitudinally extended from the retaining notches in direction toward said grip portion for the positioning of a part of said metal wire rod, and two guide notches respectively located in the two opposite lateral sides of said operating handle and respectively disposed in communication with respective distal ends of said positioning grooves remove from said retaining notches for guiding the two opposite ends of said metal wire rod toward said mounting plate.

8. The data storage device mounting structure as claimed in claim 1, wherein said operating handle is an elongated plate member, comprising two opposite side openings symmetrically located on two opposite lateral sides thereof; said two elastic retaining rods of said operating handle are respectively suspending at an outer side relative to the respective said side openings and terminating in a respectively outwardly protruded retaining flange.

* * * * *